Dec. 17, 1963  I. H. PAUL  3,114,275
DEVICE FOR GRIPPING SAW CHAINS FOR SHARPENING
Filed Nov. 20, 1961  2 Sheets-Sheet 2
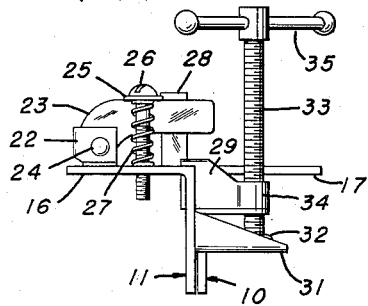
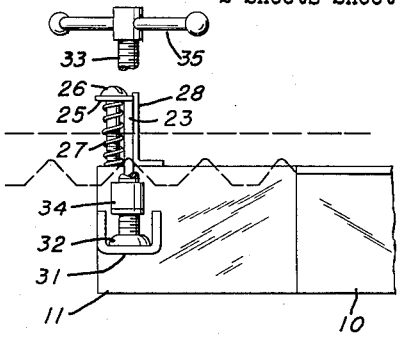
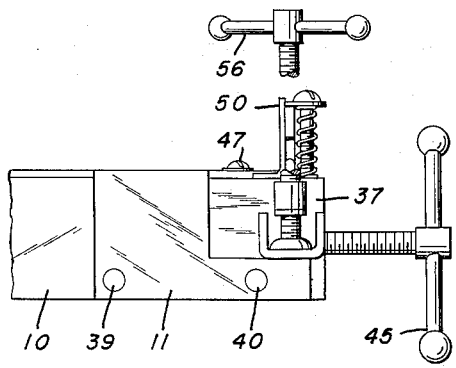
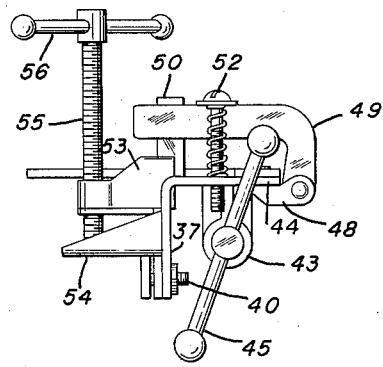
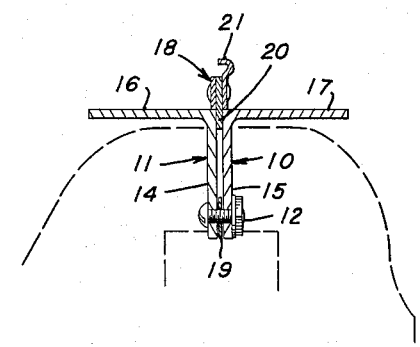
IRVIN H. PAUL
INVENTOR.
BY
Atty.

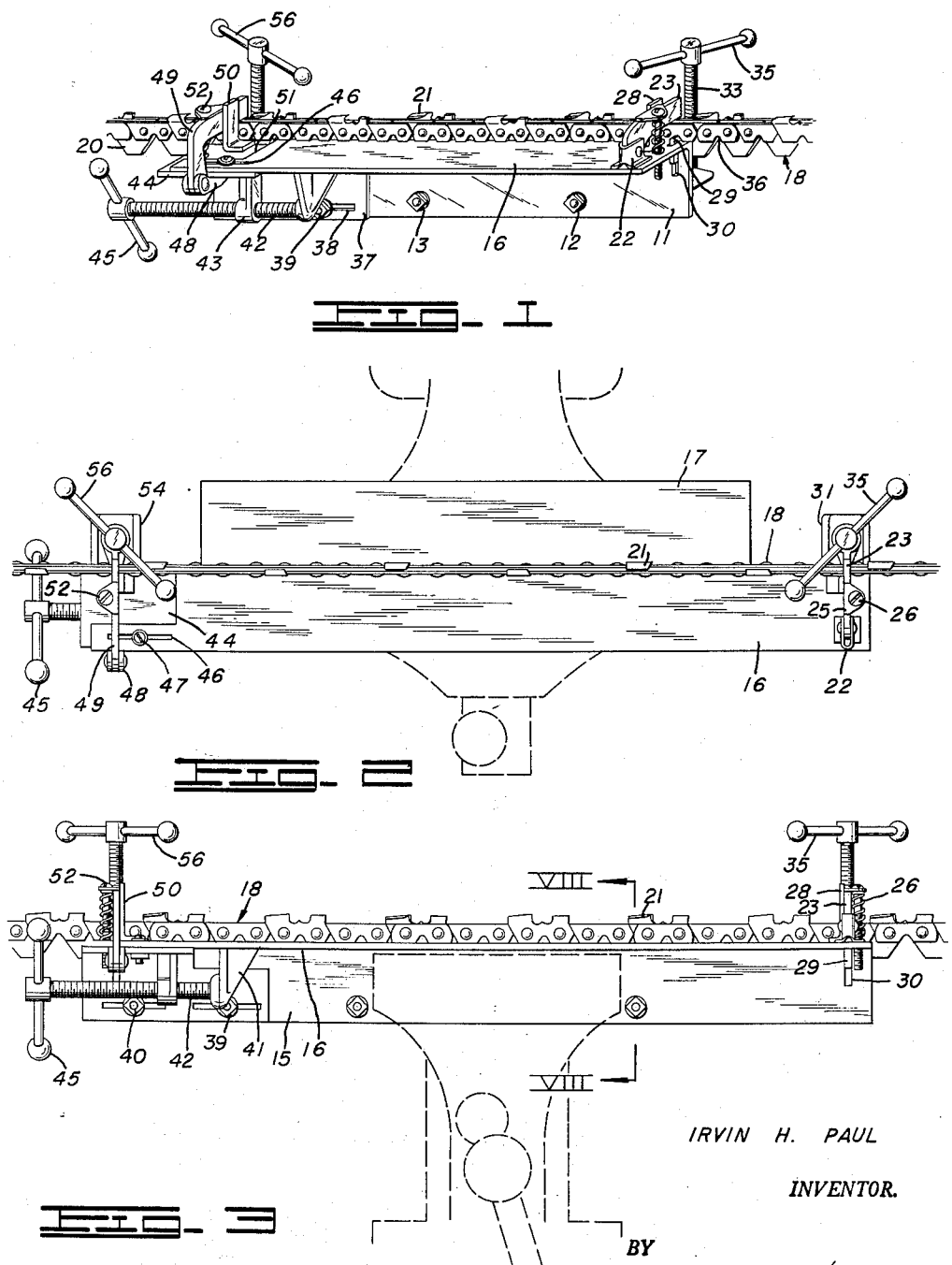

United States Patent Office 3,114,275
Patented Dec. 17, 1963

3,114,275
DEVICE FOR GRIPPING SAW CHAINS FOR SHARPENING
Irvin H. Paul, 3929 Starr Road, Harrison, Mich.
Filed Nov. 20, 1961, Ser. No. 153,372
6 Claims. (Cl. 76—78)

This invention relates to the construction of clamping devices, and the preferred form has been adapted to grip saw chains to hold the elements in position during sharpening. In its simplest form, the invention is intended to operate in conjunction with a conventional bench vise. The general function of the device is to place a section of saw chain in a straight line, and grip it with sufficient security to withstand the forces involved in sharpening. Each of the elements of a conventional saw chain is provided with a locating projection and with some form of a driving discontinuity. The device utilizes both of these to position and hold the selected section of chain, and is readily engageable and disengageable to permit the shifting of the chain with respect to the device with a minimum of effort.

In broad terms, the device includes a pair of opposite beams between which the inner locating projections of the chain elements (on the opposite side of the chain from the cutting teeth) may be clamped. The clamping force is preferably applied by a bench vise engaging portions of the beams, with the beams functioning to distribute the vise pressure laterally to act on a substantial length of chain. The device also includes a set of relatively movable bars engageable with the chain elements at opposite ends of the selected section for application of tension to the section. An adjustable support is provided underneath the engaging bars of the preferred form of the invention for accommodating the device to saw chains of various types commonly encountered. The effect of this arrangement, in conjunction with the movable engaging bars, is to alter the line of tension applied to the chain with respect to the gripping beams so that the engaging projections of the individual chain elements can be received properly between the beams without a tendency to distort the straight-line relationship of the elements constituting the section in engagement with the device.

The several features of the invention will be analyzed in detail through a discussion of the particular embodiment illustrated in the accompanying drawings. In the drawings:

FIGURE 1 presents a perspective view showing a section of saw chain in engagement with the device. The bench vise does not appear in FIGURE 1.

FIGURE 2 presents a plan view of the device shown in FIGURE 1, with the position of a bench vise being indicated in dotted lines.

FIGURE 3 presents a view in elevation of the device shown in FIGURES 1 and 2, with the bench vise being indicated in dotted lines.

FIGURE 4 presents an end view on an enlarged scale of the right end of the device as shown in FIGURE 1.

FIGURE 5 illustrates a view in elevation of the portion of the mechanism illustrated in FIGURE 4, FIGURES 4 and 5 being in projection.

FIGURE 6 illustrates a view in side elevation of the mechanism at the left end of the device shown in FIGURE 1.

FIGURE 7 presents an end view of the mechanism illustrated in FIGURE 6, FIGURES 6 and 7 being in projection.

FIGURE 8 presents a section on an enlarged scale on the plane VIII—VIII of FIGURE 3.

The illustrated device includes the beams 10 and 11 which are loosely interconnected by the bolt assemblies 12 and 13. Both of the beams are of similar angular configuration in cross-section, with the legs 14 and 15 in substantialy parallel opposite relationship, and the legs 16 and 17 in substantially co-planar relationship. The legs 16 and 17 have the principal function of establishing sufficient stiffness to distribute the pressure of the vise (shown in dotted lines) laterally over a substantial length of the saw chain 18. It is preferable to incorporate spacing washers as shown at 19 on the bolt assemblies 12 and 13 to preserve an approach to parallelism between the legs 14 and 15 of the beams as clamping pressure is applied to the locating projections 20 of the elements of the chain 18. In the clamping position shown best in FIGURE 8, the cutting portions 21 of the chain elements are in position to be engaged by conventional grinding or filing equipment which forms no part of the present invention.

Referring particularly to FIGURES 4 and 5, the pivot bracket 22 is permanently secured to the portion 16 of the beam 11 as by welding, brazing, or any other convenient means. The bar 23 is pivotally mounted in the bracket 22 on the pin 24. The upper edge of the bar 23 is provided with the lateral extension 25 which loosely receives the screw 26. The portion 16 of the beam 11 has a threaded hole engaging the screw 26, and the spring 27 applies a biasing action opposed by the screw, and tending to swing the bar 23 in a counterclockwise direction about the pin 24. A reinforcing abutment 28 is secured to the portion 16 of the beam 11, and bears against the bar 23 to resist forces resulting from engagement with the top of the chain to transmit the tension.

The underside of the chain is engaged by the adjustable abutment 29 slidably engaging the slot 30 in the beam 11. The opposite beam 10 terminates some distance from the end of the beam 11, as shown in FIGURE 5, to avoid interference with this portion of the structure. The shelf 31 is fixed with respect to the beam 11, and the bearing member 32 is permanently secured to the shelf 31 by welding or brazing. The member 32 rotatably receives the bolt 33 having threaded engagement with the collar portion 34 of the abutment 29, so that rotation of the bolt 33 by the handle 35 will result in vertical movement of the abutment member 29 with respect to the beams. Preferably, the position of the abutment member 29 is selected to enter into the driving recesses 36 of the chain to a maximum depth, and still position the chain as shown in FIGURE 8 so that the engaging projections 20 are fully received between the beams 10 and 11. If desired, the screw 26 may be replaced by a more readily engageable and disengageable type of fastening, since the installation of a particular section of chain will normally involve sufficient loosening of the screw 26 to permit counterclockwise rotation of the bar 23 to a degree to admit or remove the chain from a position between the beams 10 and 11.

Referring particularly to FIGURES 6 and 7, the mechanism for applying tension to the chain engaged by the device includes the plate 37 having a slot 38 engaged by bolts 39 and 40 to provide a limited degree of sliding adjustability in a longitudinal direction with respect to the beams 10 and 11. The downward extension 41 is secured to the portion 16 of the beam 11, and acts as an abutment against which forces from the bolt 42 can be applied. This bolt has threaded engagement with the member 43 secured to the flange 44 of the plate 37, and rotation of the bolt 42 by the handle 45 in an appropriate direction will result in movement of the plate 37 to the left with respect to the beams, as shown in FIGURE 1, to apply tension to the chain 18. The portion 16 of the beam 11 is also provided with a slot 46 for slidably receiving the bolt 47 secured to the flange 44 to stabilize the plate with respect to the beams. A pivot bracket 48 is also secured to the flange 44 to provide a pivotal mounting for the bar 49 to engage the top of the chain in the same manner as the bar 23 at the opposite end of the device. The reinforcing abutment 50 is fixed with respect to the flange 44 by welding or brazing, and functions in the same manner as the abutment 28. The top of the portion 16 of the beam 11 is cut out as shown at 51 to provide clearance for the abutment 50 and for the screw 52 which positions the bar 49 in the same manner as the screw 26 positions the bar 23. Manipulation of the bolt 42 will carry with it the entire structure including the bar 49, the abutment 50, and the adjustable abutment 53. As in connection with the opposite end of the structure, a slot is provided in the plate 37 for slidably receiving the adjustable abutment 53, and the plate 37 is also equipped with the shelf 54 which supports a bolt 55 controlled by a handle 56 for manipulating the position of the adjustable abutment 53. In general, the assembly for holding the chain at the left end of the structure shown in FIGURE 1 is the same as that at the right end, but the assembly is mounted on the movable plate 37 so that tension can be applied to the chain by rotation of the handle 45.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with vise means, a device for gripping a section of a saw chain preparatory to sharpening the same, said device comprising:

a pair of opposite beams of angular cross-section disposed with one side of each in substantially parallel relationship and normally engaged by said vise means, and the other side of each in substantially coplanar and oppositely-extending relationship, said beams being mounted for limited relative movement toward and away from each other;

a first bar pivotally mounted on one of said beams transversely with respect thereto for engaging the upper portion of said chain to grip the same for the application of tension thereto;

a plate mounted on one of said beams for longitudinal movement with respect thereto; means for longitudinally adjusting said plate with respect to said beams;

a second bar, said second bar being pivotally mounted on said plate transversely with respect to said beams for engaging the upper portion of said chain to grip the same for application of tension in said chain between said bars; and support means for said chain for engaging the underside of said chain at said bars, said support means being mounted for adjustment in a direction normal to said coplanar sides.

2. A device for gripping a section of a saw chain preparatory to sharpening the same, said device comprising:

a pair of opposite beams of angular cross-section disposed with one side of each in substantially parallel relationship, and the other side of each in substantially coplanar and oppositely-extending relationship, said beams being mounted for limited relative movement toward and away from each other;

a first bar movably mounted on one of said beams transversely with respect thereto for engaging the upper portion of said chain to grip the same for the application of tension thereto;

a plate mounted on one of said beams for longitudinal movement with respect thereto; means for longitudinally adjusting said plate with respect to said beams;

a second bar, said second bar being movably mounted on said plate transversely with respect to said beams for engaging the upper portion of said chain to grip the same for application of tension in said chain between said bars; and support means for said chain for engaging the underside of said chain at said bars, said support means being mounted for adjustment in a direction normal to said coplanar sides.

3. A device for gripping a section of a saw chain preparatory to sharpening the same, said device comprising:

a pair of opposite beams of angular cross-section disposed with one side of each in substantially parallel relationship, and the other side of each in substantially coplanar and oppositely-extending relationship, said beams being mounted for limited relative movement toward and away from each other;

a first bar movably mounted on one of said beams transversely with respect thereto for engaging the upper portion of said chain to grip the same for the application of tension thereto;

a plate mounted on one of said beams for longitudinal movement with respect thereto; means for longitudinally adjusting said plate with respect to said beams; and a second bar, said second bar being movably mounted on said plate transversely with respect to said beams for engaging the upper portion of said chain to grip the same for application of tension in said chain between said bars.

4. In combination with vise means, a device for gripping a section of a saw chain preparatory to sharpening the same, said device comprising:

a pair of opposite beams for angular cross-section disposed with one side of each in substantially parallel relationship and normally engaged by said vise means, and the other side of each in substantially coplanar and oppositely-extending relationship, said beams being mounted for limited relative movement toward and away from each other;

first means mounted on one of said beams transversely with respect thereto for engaging the upper portion of said chain to grip the same for the application of tension thereto;

a plate mounted on one of said beams for longitudinal movement with respect thereto; means for longitudinally adjusting said plate with respect to said beams; and means mounted on said plate transversely with respect to said beams for engaging the said chain to grip the same for application of tension in said chain.

5. A device for gripping a section of a saw chain preparatory to sharpening the same, said device comprising:

a pair of opposite beams of angular cross-section disposed with one side of each in substantially parallel relationship, and the other side of each in substantially coplanar and oppositely-extending relationship, said beams being mounted for limited relative movement toward and away from each other;

first means mounted on one of said beams transversely with respect thereto for engaging the said chain to grip the same for the application of tension thereto;

a plate mounted on one of said beams for longitudinal movement with respect thereto; means for longitudinally adjusting said plate with respect to said beams; and means mounted on said plate transversely with respect to said beams for engaging the said chain to grip the same for application of tension in said chain.

6. A device for gripping a section of a saw chain having a series of links preparatory to sharpening the same, said device comprising:

a pair of opposite beams of angular cross-section disposed with one side of each in substantially parallel relationship, and the other side of each in substantially coplanar and oppositely-extending relationship, said beams being mounted for limited relative movement toward and away from each other; and spaced gripping means mounted on one of said beams, said gripping means normally intersecting said chain and being relatively movable toward and away from each other, and transversely interengageable with spaced links, respectively, of a saw chain to apply tension to the portion of said chain between said spaced links.

References Cited in the file of this patent

UNITED STATES PATENTS

| | | |
|---|---|---|
| 1,125,253 | Barber | Jan. 19, 1915 |
| 2,832,237 | Calver | Apr. 29, 1958 |

FOREIGN PATENTS

| | | |
|---|---|---|
| 156,975 | Sweden | Nov. 20, 1956 |